US012246419B2

(12) United States Patent
Hodgson et al.

(10) Patent No.: US 12,246,419 B2
(45) Date of Patent: Mar. 11, 2025

(54) MITRE JOINT SUPPORT

(71) Applicant: Tomm Tech Pty Ltd, Bunbury (AU)

(72) Inventors: Thomas Hodgson, Bunbury (AU); Riley Hodgson, Bunbury (AU)

(73) Assignee: Tomm Tech Pty Ltd, Bunbury (AU)

( * ) Notice: Subject to any disclaimer, the term of this patent is extended or adjusted under 35 U.S.C. 154(b) by 325 days.

(21) Appl. No.: 17/973,097

(22) Filed: Oct. 25, 2022

(65) Prior Publication Data

US 2023/0043688 A1 Feb. 9, 2023

Related U.S. Application Data

(63) Continuation-in-part of application No. 17/052,169, filed as application No. PCT/AU2019/050418 on May 7, 2019, now Pat. No. 11,511,394.

(30) Foreign Application Priority Data

May 7, 2018 (AU) ................................ 2018901554

(51) Int. Cl.
*B25B 5/00* (2006.01)
*B25B 5/06* (2006.01)
*B25B 5/14* (2006.01)

(52) U.S. Cl.
CPC .............. *B25B 5/068* (2013.01); *B25B 5/142* (2013.01)

(58) Field of Classification Search
CPC ........... B25B 5/00; B25B 5/003; B25B 5/067; B25B 5/101; B25B 5/068; B25B 5/125; B25B 5/147
See application file for complete search history.

(56) References Cited

U.S. PATENT DOCUMENTS

| | | | | |
|---|---|---|---|---|
| 5,010,708 | A | 4/1991 | Evans et al. | |
| D909,855 | S | 2/2021 | Kellum | |
| 11,078,720 | B2 | 8/2021 | Kellum | |
| 11,511,394 | B2 * | 11/2022 | Hodgson | B25B 5/068 |
| 2009/0241610 | A1 | 10/2009 | Watts et al. | |
| 2014/0064844 | A1 | 3/2014 | Massey | |
| 2020/0032578 | A1 | 1/2020 | Parry | |

(Continued)

FOREIGN PATENT DOCUMENTS

| | | | |
|---|---|---|---|
| CN | 103046844 | | 4/2013 |
| DE | 932876 | C | 9/1955 |
| GB | 905094 | A | 9/1962 |

(Continued)

OTHER PUBLICATIONS

European Patent Office, European Search Report for EP 19799384.3, mail date Dec. 17, 2021, 9 total pages.

(Continued)

*Primary Examiner* — Lee D Wilson
(74) *Attorney, Agent, or Firm* — SoCal IP Law Group LLP; Michael D. Harris

(57) ABSTRACT

A support for a mitre joint uses two wedging mechanisms disposed at a characteristic angle. Each wedging mechanism is arranged to locate inside a hollow rail, such as within an extruded hollow beam. The wedging mechanism can be operated from outside the joint in order to clamp the mechanism in position. The mechanism has a self centering capability to assist in accurately locating the rails relative to each other.

11 Claims, 6 Drawing Sheets

(56) References Cited

U.S. PATENT DOCUMENTS

| | | | | |
|---|---|---|---|---|
| 2021/0046615 | A1* | 2/2021 | Hodgson | B25B 5/147 |
| 2023/0043688 | A1* | 2/2023 | Hodgson | B25B 5/102 |

FOREIGN PATENT DOCUMENTS

| | | | |
|---|---|---|---|
| GR | 1006024 | B | 10/2008 |
| RU | 1819318 | | 5/1993 |
| RU | 1819318 | A3 | 5/1993 |
| WO | 2017205940 | A1 | 12/2017 |
| WO | 2018201203 | A1 | 11/2018 |
| WO | 2019213699 | A1 | 11/2019 |

OTHER PUBLICATIONS

State Intellectual Property Office of People's Republic of China, First Office Action for 201980031087.X, mail date Dec. 29, 2021, 9 total pages.

International Search Report for PCT Application No. PCT/AU2019/050418 dated Aug. 16, 2019.

* cited by examiner

MITRE JOINT SUPPORT

RELATED APPLICATION INFORMATION

This application is a continuation in part of U.S. patent application Ser. No. 17/052,169, filed Oct. 30, 2020, entitled "MITRE JOINT SUPPORT" which claims priority to International PCT Application No. PCT/AU2019/050418, filed May 7, 2019, entitled "MITRE JOINT SUPPORT" which claims priority to Australian Patent Application No.: 2018901554 filed May 7, 2018, the disclosures and figures of which are incorporated by reference as if set forth herein in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

The present invention relates to the connection of two hollow section beams at an angle to form a mitre joint. The invention has been created in the context of metal fencing panels and gates, but is considered to have wider application, including in the context of metal framed doors and windows.

Description of the Related Art

International patent application numbers PCT/AU2017/050544 and PCT/AU2018/050415, the contents of which are incorporated herein by reference, describe panel systems used primarily for the formation of fences and gates. These systems feature a rectangular frame made of hollow aluminium rails with slats extending between the rails internally of the frame.

The use of aluminium (or other metal) rails to form a rectangular frame is common in the building industry. Such frames may support windows, glass doors, fencing panels, security screens, insect screens and many similar applications.

Some common problems exist in the creation of rectangular frames. One problem is the requirement that the rails are connected at precisely 90°. Errors in cutting, in drilling, or in alignment can result in a frame which is not 'square'. In some cases this is merely unsightly. In other cases, the result may be a final product which does not operate correctly, or fit into a required space.

A second problem is that the mitre joint between rails frequently represents a weak point of the frame. This is exacerbated by the fact that the weak point is at an outer edge of the frame, where the most leverage can be applied. Where the frame is subject to significant load, or where the frame is used for security purposes, this can represent a difficult problem to address.

Thirdly, a common form of connection of mitre joints between hollow rails requires forcing an internally, preformed 90° bend into the hollow section using an interference fit. Where there is any misalignment in the rails this method can lead to damage to the rails; looseness of the connection; and/or difficulty in removal of the bend.

Often, is it necessary to weld rails together to obtain sufficient joint strength. Welding can create further problems, such as distortion due to heat and damage to surface coatings. If a welded joint requires grinding to ensure smoothness, the strength of the join may be compromised.

The present invention proposes a method of construction of a mitre joint between generally hollow members which at least partially addresses some of these concerns. While the invention is described for use in the creation of rectangular frames, it will be appreciated that its uses extend into connection of hollow frame members generally, with angles of connection which may not be at 90°. As such, the present invention may be used in other situations such as in the construction of hollow framed furniture, or indeed virtually any application when tubular shapes formed from a rigid material are to be connected.

According to one aspect of the present invention there is provided a support for a mitre joint, the support having a central region, the support having a first arm extending away from the central region in a first direction and a second arm extending away from the central region in a second direction, the second direction being angled with respect to the first direction by a given angle;

each of the first arm and the second arm having:

(a) a fixed portion oriented generally in the respective first or second direction; the fixed portion having an outer surface, and having an inner surface opposed to the outer surface and inclined relative to the respective first or second direction at an inclination angle;

(b) a moveable portion arranged to move generally in the respective first or second direction, the moveable portion having an outer surface opposed to an inner surface, the inner surface being inclined relative to the outer surface at the inclination angle; and (c) an adjustment mechanism arranged to move the moveable portion;

wherein the inner surface of the moveable portion is arranged to abut the inner surface of the fixed portion, with the outer surface of the moveable portion being generally aligned in the respective first or second direction;

the support having a first continuous outer surface incorporating the outer surface of the fixed portion of the first arm, and a second continuous outer surface incorporating the outer surface of the second arm;

the central region having a first pressing face, the first pressing face extending between the first continuous outer surface and the second continuous outer surface, the first pressing face being angled with respect to the first direction by a pressing angle which is less than the given angle.

The central region preferably has a second pressing face, the second pressing face extending between the inner surfaces of the respective fixed portions of the first and second arms.

The first pressing face is preferably parallel to the second pressing face.

The pressing angle may be 50% of the given angle.

The given angle may be 90°. Alternatively, the given angle may be an acute angle or an obtuse angle.

Preferably the outer surface of each fixed portion is oriented in the respective first or second direction;

Preferably each moveable portion is generally prismatic.

In a preferred embodiment, the adjustment mechanism is a linear actuator, such as a lead screw.

It is preferred that the lead screw has a head located within the central region of the support.

The lead screw may extend through the second pressing face.

In a preferred embodiment, the lead screw of the first arm is laterally offset in a transverse direction relative to the lead screw of the second arm.

The outer surface of each fixed arm may be ridged. In a preferred embodiment, the outer surface of each fixed arm has ridges oriented perpendicular to the respective first or second direction.

The outer surface of each moveable arm may be ridged. In a preferred embodiment, the outer surface of each moveable arm has ridges oriented perpendicular to the respective first or second direction.

Each fixed arm preferably has a narrow end remote from the central region. The narrow end may include a rounded or bevelled edge portion.

Each moveable arm preferably has a narrow end oriented towards the central region, and a wide end oriented away from the central region. The wide end may include a rounded or bevelled edge portion.

Each moveable arm preferably includes an internally threaded aperture extending in the respective direction inwardly from the narrow end in the respective first or second direction. The internally threaded aperture is arranged to receive the adjustment mechanism.

Each of the first and second arms may include two moveable portions. In this embodiment the outer surface of the fixed portion may be inclined relative to the respective first or second direction at a second inclination angle, and a second moveable portion may have an inner surface arranged to abut the outer surface of the fixed portion, the inner surface of the second moveable portion being inclined relative to an outer surface of the second moveable portion at a second inclination angle. Each of the first and second arms may include two adjustment mechanisms, one associated with each moveable portion. Alternatively, the two moveable portions may be coupled together.

The movement of the moveable portion may be readily reversive, allowing for easy release of a supported mitre joint. In an alternative embodiment, the moveable portion may be arranged to move in the respective first or second direction into a locked position whereby the outer surface of the moveable arm partially embeds within a rail within the supported mitre joint.

According to a second aspect of the present invention there is provided a support for a mitre joint, the support having a central region, the support having a first arm extending away from the central region in a first direction and a second arm extending away from the central region in a second direction, the second direction being angled with respect to the first direction by a given angle;

each of the first arm and the second arm having:

(a) a fixed portion oriented generally in the respective first or second direction; the fixed portion having an outer surface, and having an inner surface opposed to the outer surface and inclined relative to the respective first or second direction at an inclination angle;

(b) a moveable portion arranged to move generally in the respective first or second direction, the moveable portion having an engaging surface, the engaging surface being inclined relative to the respective first or second direction at the inclination angle; and (c) an adjustment mechanism arranged to move the moveable portion;

wherein the inner surface of the moveable portion is arranged to abut the inner surface of the fixed portion.

Each of the first arm and the second arm may have two fixed portions, with the outer surfaces of each fixed portion being generally parallel, and with the moveable portion being located between the two fixed portions and having two opposed engaging surfaces.

DESCRIPTION OF THE DRAWINGS

It will be convenient to further describe the invention with reference to preferred embodiments of the present invention. Other embodiments are possible, and consequently the particularity of the following discussion is not to be understood as superseding the generality of the preceding description of the invention. In the drawings.

Figure 1:
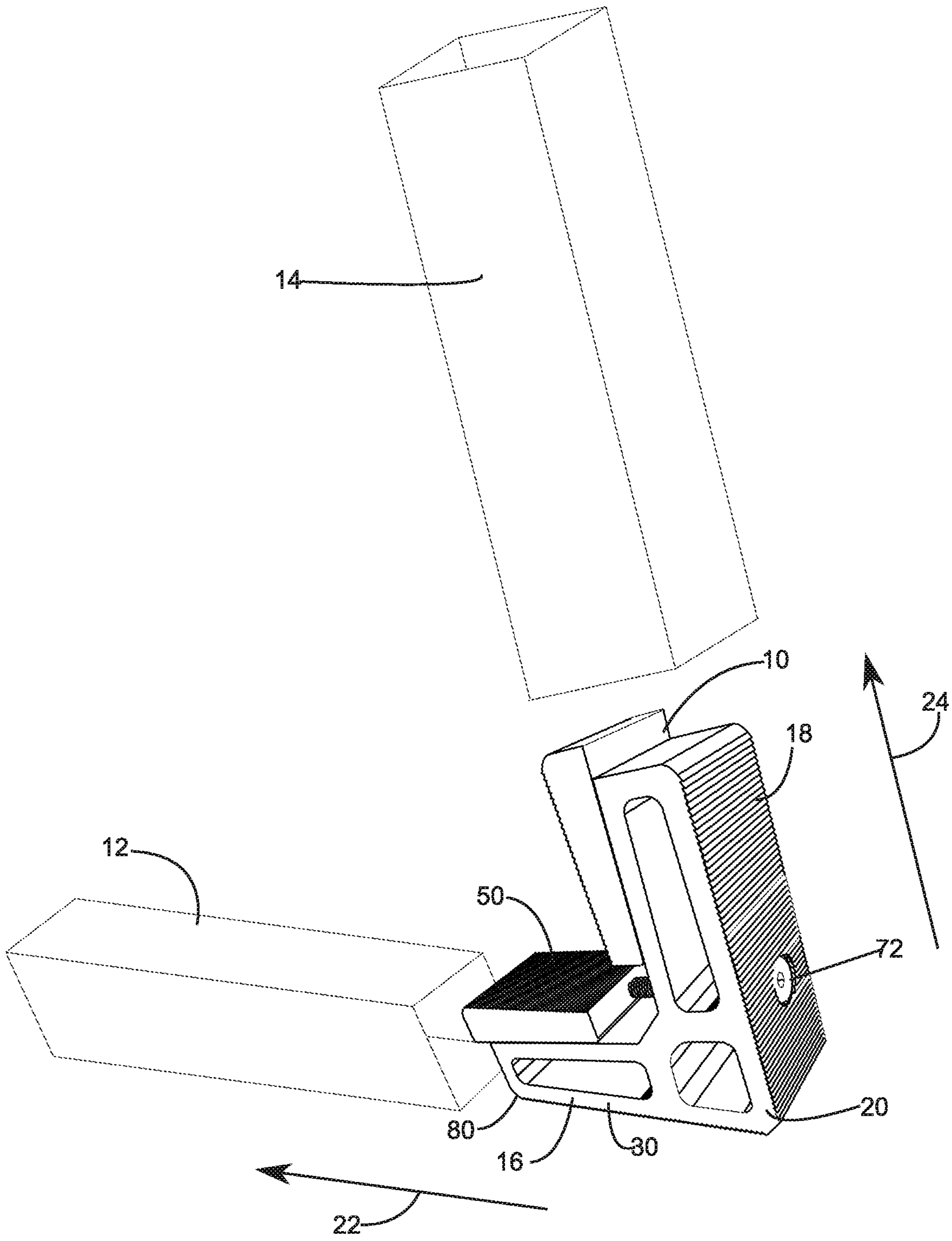
FIG. 1 is a perspective of a mitre join support in accordance with the present invention; shown immediately prior to use.
Figure 2:
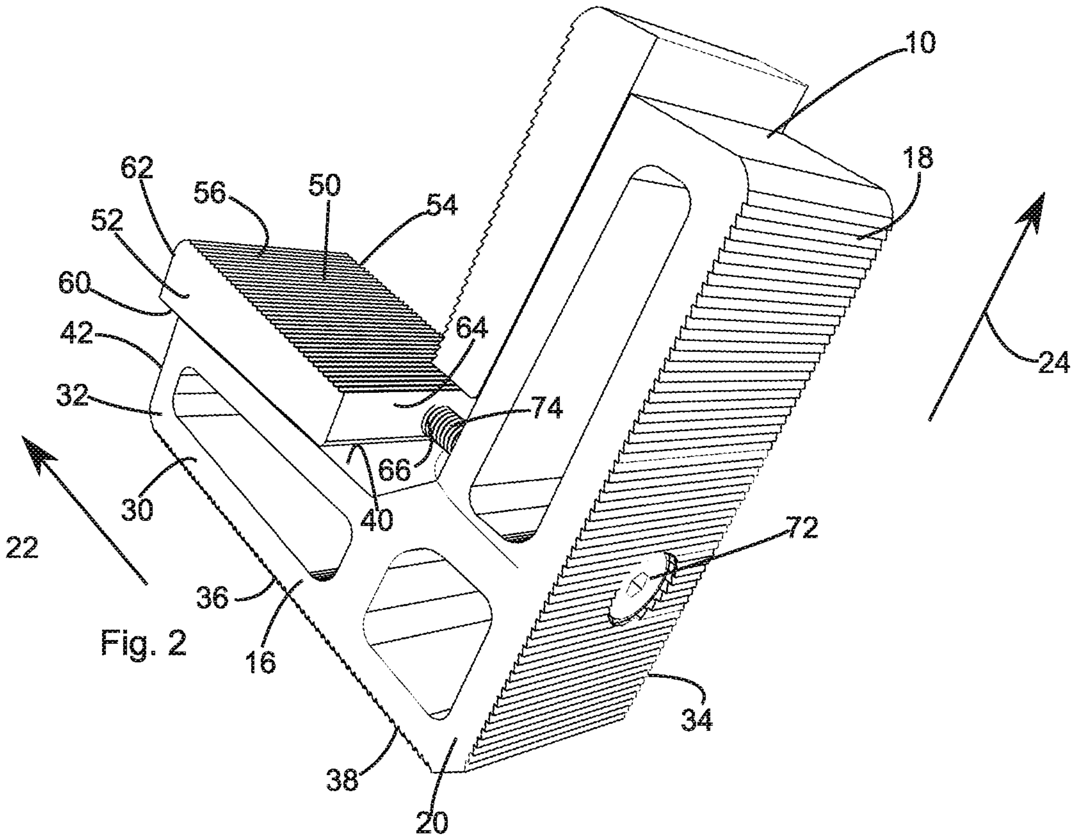
FIG. 2 is a rear perspective of the mitre join support of FIG. 1.
Figure 3:
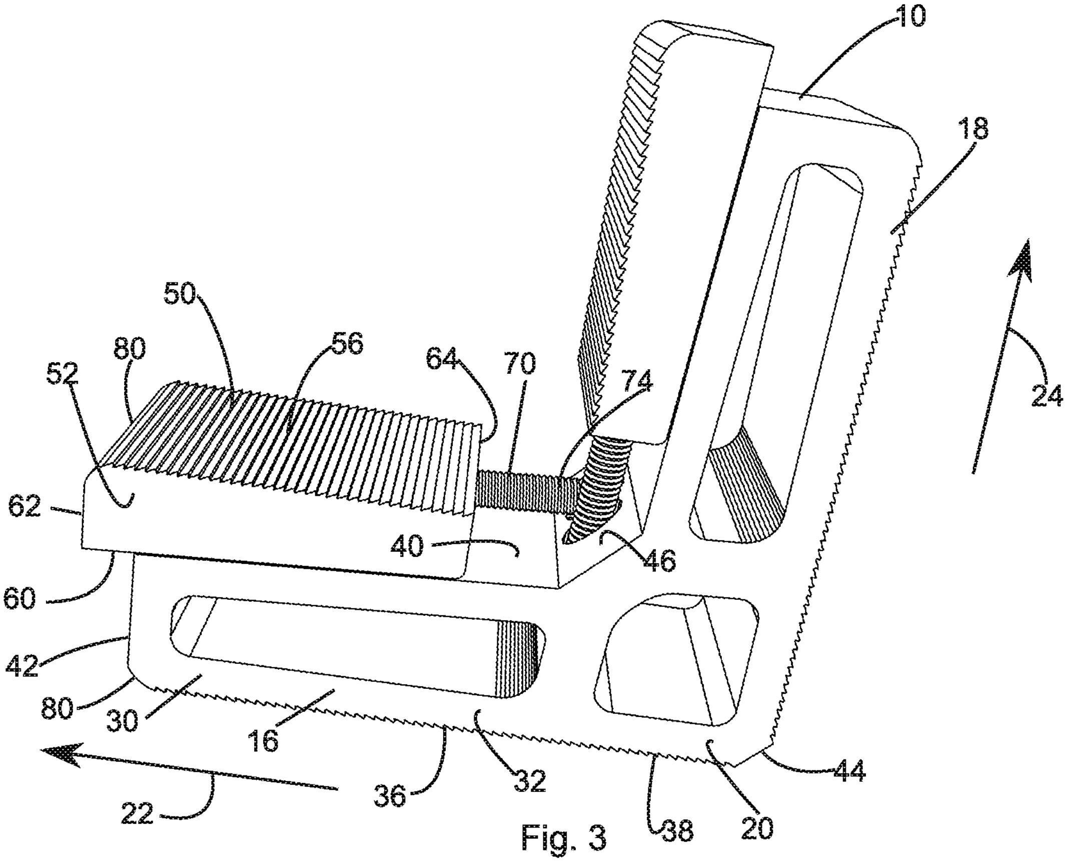
FIG. 3 is a side perspective of the mitre join support of FIG. 1.
Figure 4:
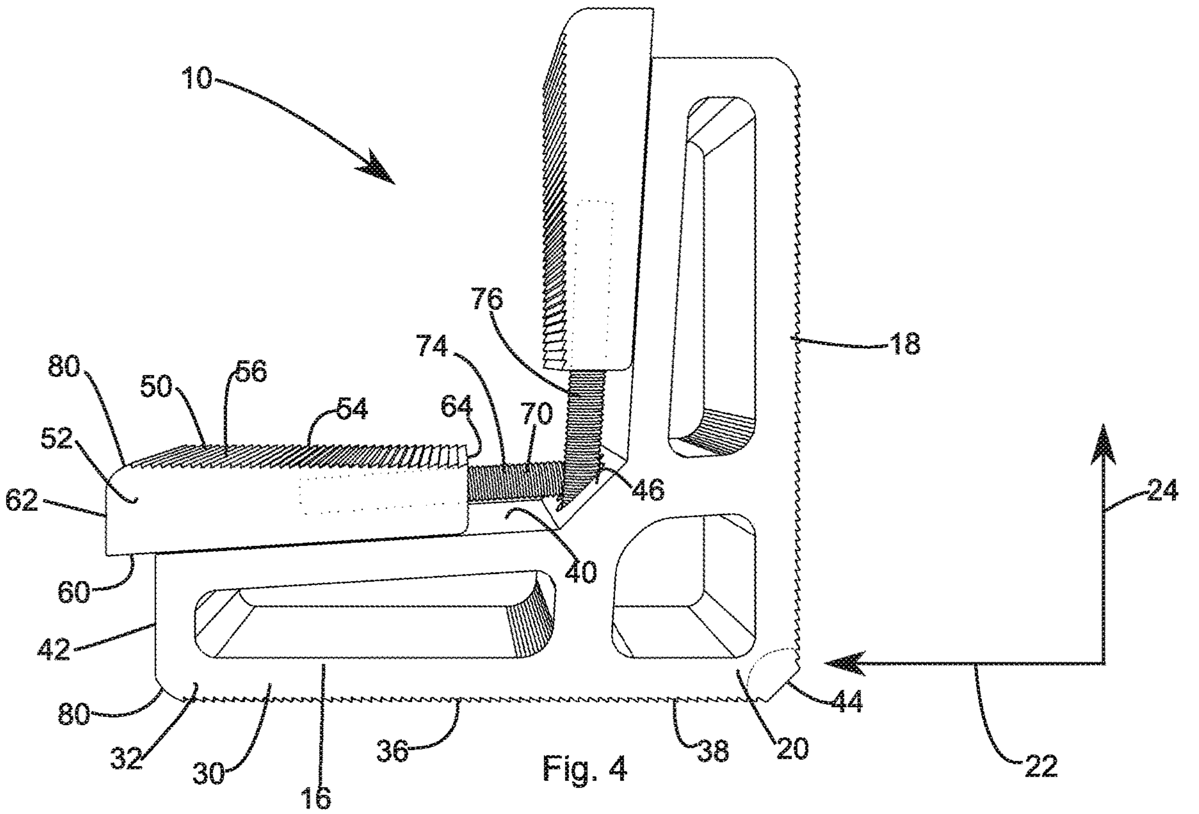
FIG. 4 is a side view of the mitre join support of FIG. 1.
Figure 5:
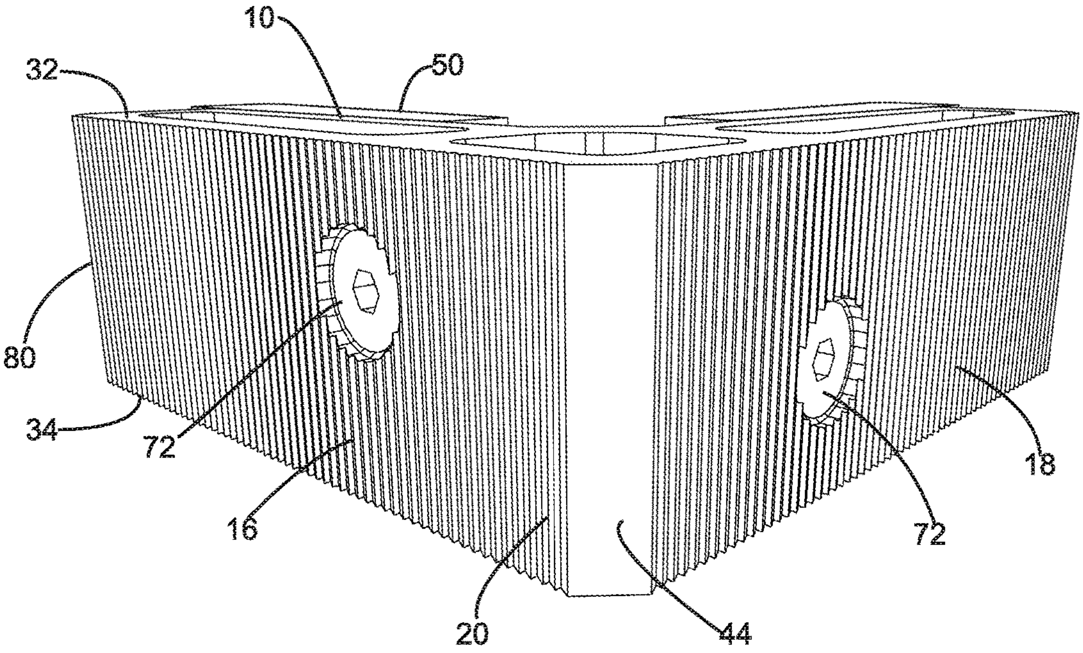
FIG. 5 is a behind perspective of the mitre join support of FIG. 1.
Figure 6:
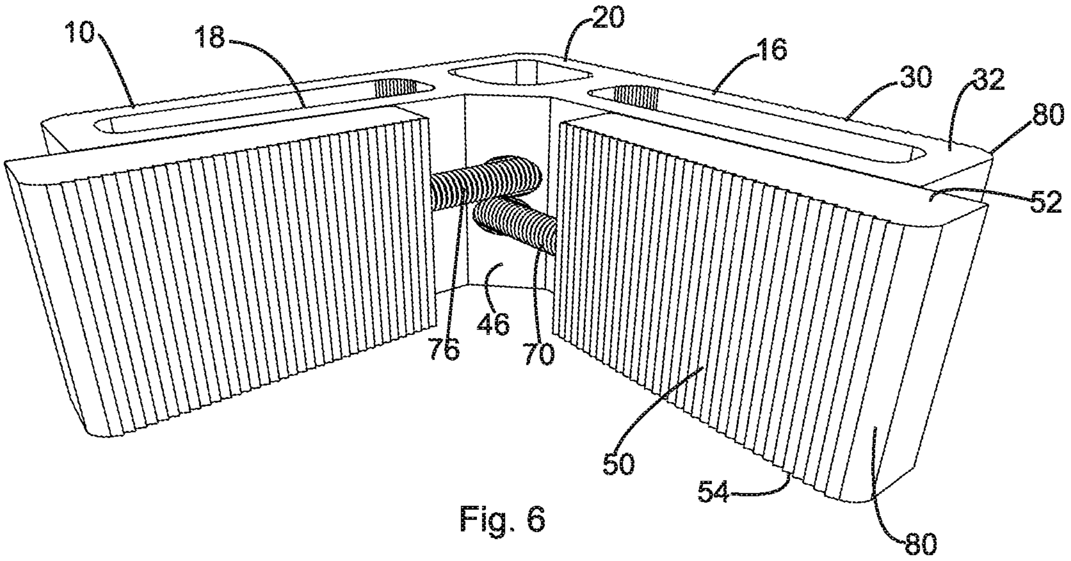
FIG. 6 is a front perspective of the mitre join support of FIG. 1.
Figure 7:
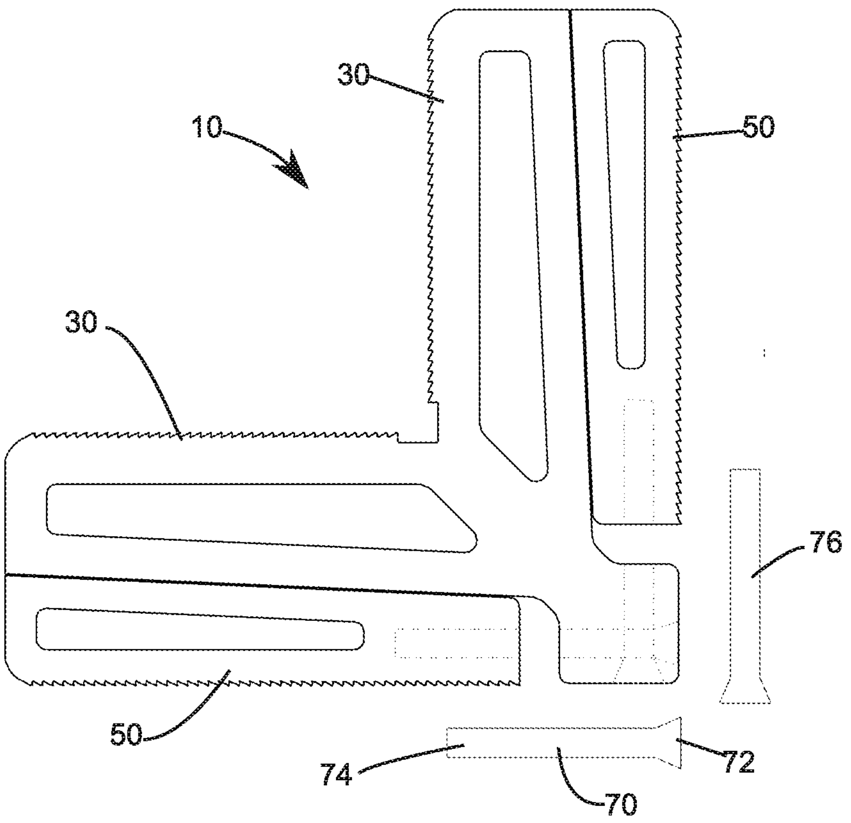
FIG. 7 is a side view of a mitre join support in accordance with a second embodiment of the present invention.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Referring to the FIGS. 1 to 6, there can be seen a mitre join support 10 which is arranged to connect a first hollow rail 12 to a second hollow rail 14 at a given angle of 90°.

The hollow rails 12, 14 are each square in cross section. It will be appreciated that although the embodiments shown herein are arranged for these particular rails 12, 14 the relative proportions of the mitre join support 10 can be readily altered to accommodate hollow rails of different proportions.

The mitre join support 10 has a first arm 16 arranged to be inserted within the first hollow rail 12 and a second arm

18 arranged to be inserted within the second hollow rail 14. The first arm 16 and the second arm 18 each extend away from a central region 20.

The first arm 16 extends away from the central region 20 in a first direction 22. The second arm 18 extends away from the central region 20 in a second direction 24. The first direction 22 is perpendicular to the second direction 24, thus creating the 90° which is characteristic of the mitre join support 10.

The first arm 16 and the second arm 18 are formed in the same way, and thus the following description of the first arm 16 applies equally to the second arm 18.

The first arm 16 has a fixed portion 30, which extends away from the central region 20 in the first direction 22. The fixed portion 30 is generally prismatic, with a common cross section between a first side 32 and a second side 34. The first side 32 and second side 34 are each generally flush, and are arranged to locate within the first hollow rail 12 loosely abutting side walls of the hollow rail 12. The fixed portion 30 has an outer surface 36 which extends in the first direction 22, and from a lower edge of the first side 32 to a lower edge of the second side 34. The arrangement is such that the outer surface 36 of the fixed portion 30 extends from a first outer surface 38 of the central region 20 to form a continuous outer surface along a lower face of the mitre join support 10. The outer surface 36 of the fixed portion 30 is arranged to locate against a bottom wall of the first hollow rail 12.

The outer surface 36 is ridged, with ridges extending transversely across the outer surface 36 from the first side 32 to the second side 34.

The fixed portion 30 has an inner surface 40 opposed to the outer surface 36. The inner surface 40 extends across a top of the fixed portion 30, from the first side 32 to the second side 34.

The inner surface 40 is inclined relative to the outer surface 36 at an inclination angle. In the embodiment of the drawings, the inclination angle is between 3° and 4°. The arrangement is such that the inner surface 40 tapers towards the outer surface 36 moving away from the central region 20. In this way, the fixed portion 30 has a relatively narrow outer end 42 remote from the central region 20.

The first arm 16 has a moveable portion 50, which is generally complementary to the fixed portion 30. The moveable portion 50 is generally prismatic, with a generally common cross section between a first side 52 and a second side 54. The first side 52 is arranged to be generally co-planar with the first side 32 of the fixed portion 30, and the second side 54 is arranged to be generally co-planar with the second side 34 of the fixed portion 30.

The moveable portion 50 has an outer surface 56, arranged to locate against an upper wall of the first hollow rail 12. The outer surface 56 is ridged, with ridges extending transversely across the outer surface 56 from the first side 52 to the second side 54.

The moveable portion 50 has an inner surface 60 opposed to the outer surface 56. The inner surface 60 extends across a lower face of the moveable portion 50, from the first side 52 to the second side 54.

The inner surface 60 is inclined relative to the outer surface 56 at the same inclination angle as in the fixed portion 30. In contrast to the fixed portion 30, the arrangement for the moveable portion 50 is that the inner surface 60 tapers away from the outer surface 56 moving away from the central region 20. In this way, the fixed portion 50 has a relatively wide outer end 62 remote from the central region 20, and a relatively narrow inner end 64 facing the central region 20.

The arrangement is such that the inner surface 60 of the moveable portion 50 abuts and bears against the inner surface 40 of the fixed portion 30. With the same angle of inclination, but a reversed orientation, this means that the outer surface 56 of the moveable portion 50 is parallel to the outer surface 36 of the fixed portion 30.

It will be apparent that this arrangement provides a wedging effect. Movement of the moveable portion 50 in the first direction 22 acts to either increase or decrease the effective depth of the first arm 16.

Movement of the moveable portion 50 is effected by means of an adjustment mechanism, based around a linear actuator formed by a lead screw 70. The moveable portion 50 has an internally threaded aperture 66 extending inwardly of the inner end 64, in the first direction 22. The lead screw 70 has a head 72 arranged to seat within the central region 20, and a threaded shaft 74 arranged to engage within the aperture 66. As the head 72 is turned, for instance using a tool such as an Allen key, the moveable portion 50 moves along the lead screw 70.

In use, the lead screw 70 is loosened to decrease the effective depth of the first arm 16. The first arm 16 can then be introduced into the first hollow rail 12. It will be noted that the outermost edges of the outer surfaces 36, 56 are rounded at edges 80 to assist entry of the first arm 16 into the first hollow rail 12. Once the first arm 16 has slid inwardly until the first hollow rail 12 abuts the central region 20, the lead screw 70 can be turned to increase the effective depth of the first arm 16.

This continues until the effective depth of the first arm 16 corresponds to the gap between the bottom wall and the upper wall of the first hollow rail 12. When this depth is reached, the outer surface 36 of the fixed portion 30 will bear against the bottom wall, and the outer surface 56 of the moveable portion 50 will bear against the upper wall. The ridged nature of the outer surfaces 36, 56 increases the degree of friction holding them against the inner surfaces of the first hollow rail 12. The parallel positions of the two outer surfaces 36, 56 means that the bearing engagement takes place across the outer surfaces 36, 56, reducing the likelihood of bearing concentrations and having a self-centering function.

The second arm 18 acts in an identical fashion to secure the second rail 14 relative to the central region 20.

It will be understood that if the lead screw 70 associated with the first arm 16 and a lead screw 76 associated with the second arm 18 are located in the same plane then the operation of one may interfere with the operation of the other. For this reason the lead screws 70, 76 are laterally offset; with one positioned towards the first side 32 and the other positioned towards the second side 34.

The self-centering nature of the bearing engagement between the first arm 16 and the first hollow rail 12; and the second arm 18 and the second hollow rail 14; means that the final angular disposition between the rails 12, 14 will match the given angle of the mitre join support 10. The action of tightening the lead screws 70, 76 will both lock the mitre joint and will pull the respective hollow rails 12, 14 towards the central portion 20 to ensure a clean finish.

In the embodiment of FIGS. 1 to 6, it is envisaged that the lead screw 70 can be loosened to allow the first hollow rail 12 to be released from the mitre join support 10. It will be appreciated that in an alternative arrangement, the screw 70 may be arranged to load the first arm 16 such that the outer surfaces 36, 56 actively embed within the internal surfaces of the first hollow rail 16. In such an arrangement, it is envisaged that the screw 70 may be removed entirely once the first arm is loaded so as to created a permanent joint, which may be used in structural applications.

Manufacture of the mitre join support 10 requires a high degree of precision. In particular, the forming of an exact given angle can be problematic.

One way in which the present invention has been able to achieve this is by the use of a hydraulic press which is able to act on both the first arm 16 and the second arm 18 simultaneously. This is possible due to the use of a first pressing face 44 on the outside of the mitre join support 10. The first pressing face 44 extends between the outer surfaces 38 of the central region; that is, between the continuous outer surface which includes the outer surface 36 of the first arm 16 and the continuous outer surface which includes the outer surface 36 of the second arm 18.

The first pressing face 44 is angled equally with respect to the first arm 16 and the second arm 18; that is, it is angled at 45° relative to both of them.

It has also proved useful to support the mitre join support 10 during pressing by use of a second pressing surface 46. The second pressing surface 46 extends between the inner surfaces 40 of the first arm 16 and the second arm 18. The second pressing surface 46 is parallel to the first pressing surface 40, and spaced apart across a diagonal extent of the central region 20.

Other embodiments of the present invention are possible. Some examples of these are shown in FIGS. 7 to 11.

The mitre join support 10 of FIGS. 1 to 6 has fixed portions 30 on the outside of the join, and moveable portions 50 on the inside. In the embodiment depicted in FIGS. 7, these positions are reversed. The fundamental operation of the mitre join support is unchanged.

Figure 8:
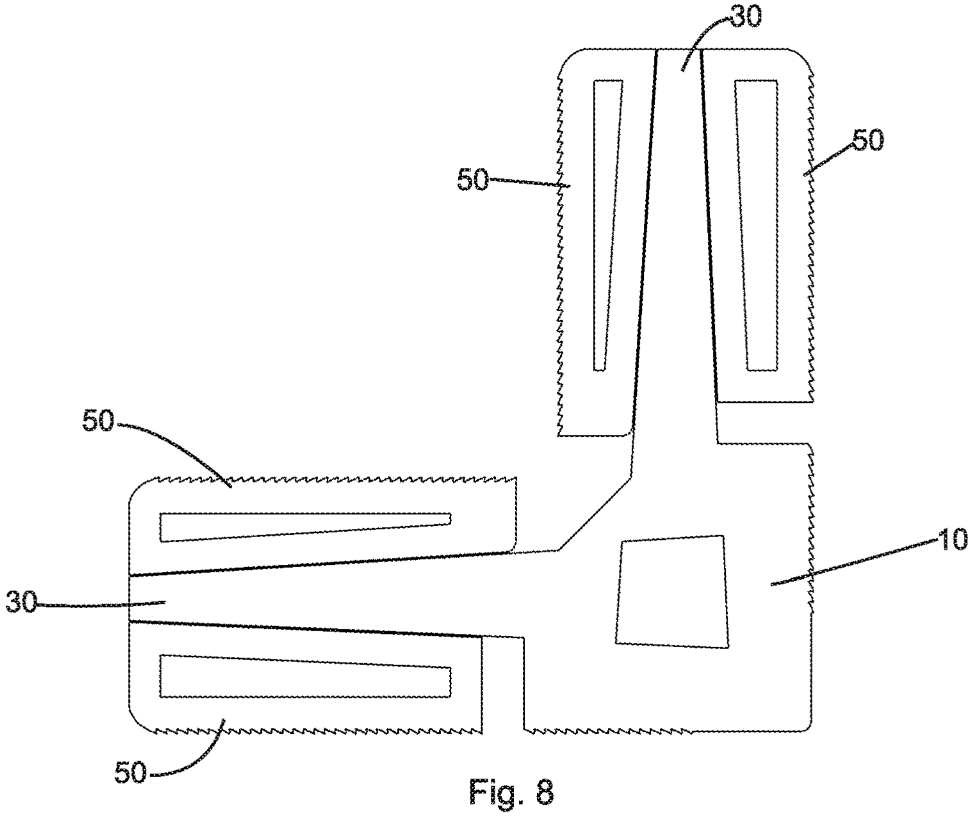
FIG. 8 is a side view of a mitre join support in accordance with a third embodiment of the present invention.
Figure 9:
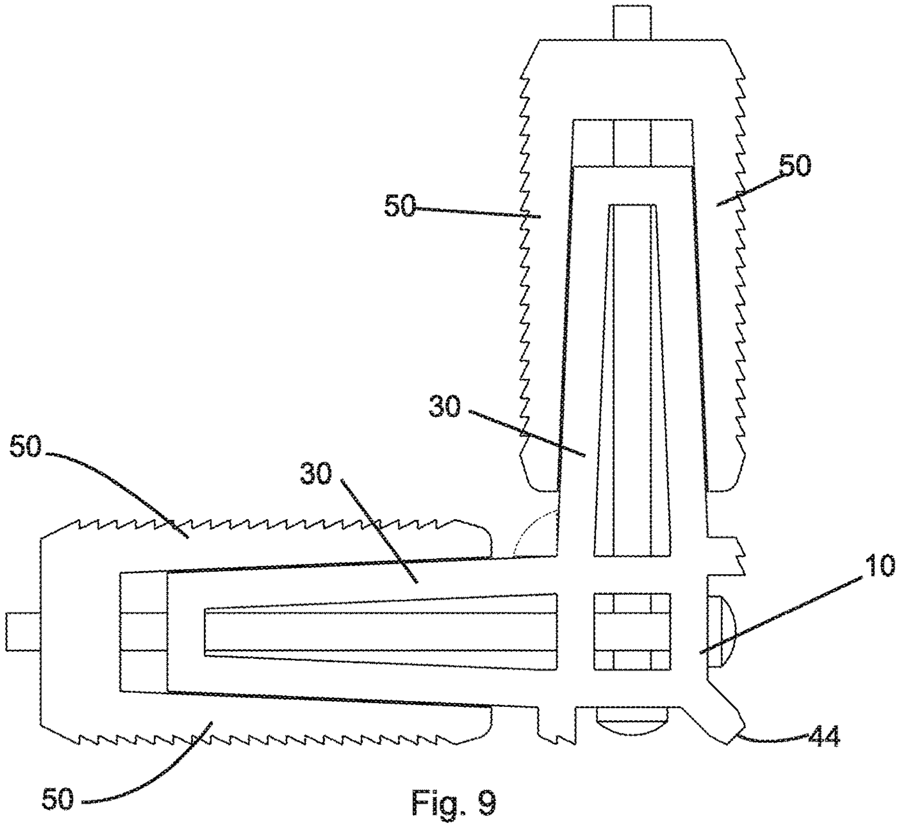
FIG. 9 is a side view of a mitre join support in accordance with a fourth embodiment of the present invention.

FIGS. 8 and 9 show arrangements where each of the first and second arms 16, 18 include two wedging arrangements. In these embodiments the fixed portion 30 is located between two moveable portions 50. Rather than an outer surface 36, the fixed portion 30 of FIGS. 8 and 9 has effectively two inner surfaces 40, each of which is inclined relative to the first direction 22.

The embodiment of FIG. 8 suggests that the two moveable portions 50 can be moved independently, potentially expanding the range of sizes of hollow rail the mitre join support can accommodate.

The embodiment of FIG. 9 has the two moveable portions 50 coupled together, with the lead screw 70 extending through the centre of the fixed portion 30 in order to capture an outer end of the moveable portions 50. This embodiment would appear to be useful in an environment of tight tolerances.

Figure 10:
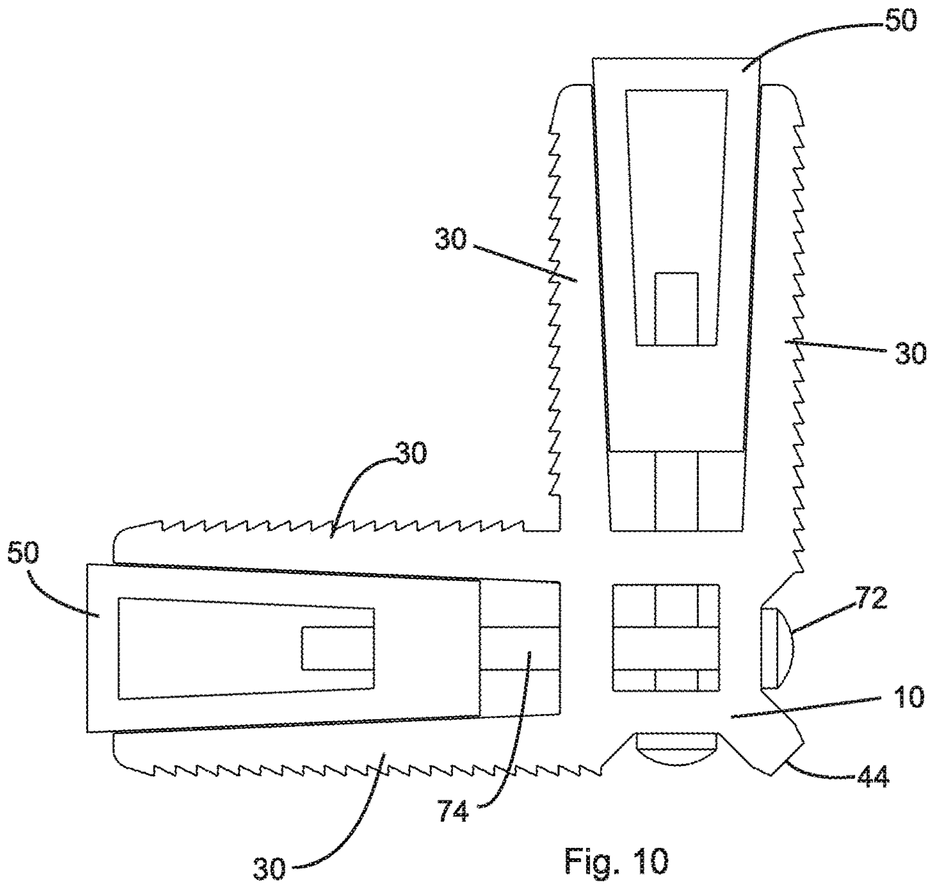
FIG. 10 is a side view of a mitre join support in accordance with a fifth embodiment of the present invention.

The embodiment of FIG. 10 is essentially a reverse of the arrangement of FIG. 9, whereby a single moveable portion 50 is located between two fixed portions 30. It will be appreciated that the resulting wedging action is effectively the same.

Figure 11:
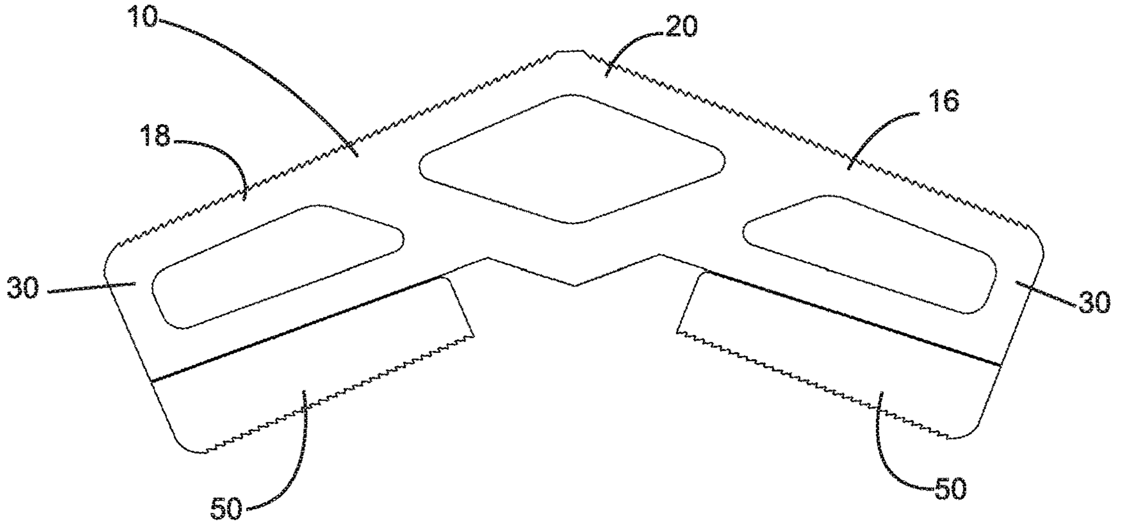
FIG. 11 is a side view of a mitre join support in accordance with a sixth embodiment of the present invention.

The above embodiments have all resulted in mitre joins having a characteristic given angle of 90°. It will be apparent to a skilled addressee that the mechanism described can also be used for mitre joins requiring an acute angle, or an obtuse angle. FIG. 11 demonstrates an embodiment of the present invention employing an obtuse angle of about 140°.

Modifications and variations as would be apparent to a skilled addressee are deemed to be within the scope of the present invention.

The self-centering nature of the present invention has been described with reference to the first embodiment disclosed, and is apparent in the other shown embodiments. This self-centering nature allows for a relatively unskilled user to achieve an exact desired given angle, with no significant risk of misalignment. The use of distributed load across bearing surfaces also mitigates against damage to the rails.

It should be noted that the preferred embodiments described above each involve a mitre join support 10 which has a fixed portion 30 of the first arm 16; a central region 20; and a fixed portion 30 of the second arm 18 all formed from a single integral member. It is envisaged that this member may be formed by extrusion, with individual supports 10 cut from a continuous extrusion. As a result, any weakness in the mitred joint is no longer at the corner, but spaced from the corner by the length of the first and second arms 16, 18. This potentially provides for a significantly stronger overall structure.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A support for a mitre joint, the support having a central region, the support having a first arm extending away from the central region in a first direction and a second arm extending away from the central region in a second direction, the second direction being angled with respect to the first direction by a given angle;

each of the first arm and the second arm having:

(d) a fixed portion oriented generally in the respective first or second direction; the fixed portion having an outer surface, and having an inner surface opposed to the outer surface and inclined relative to the respective first or second direction at an inclination angle;

(e) a moveable portion arranged to move generally in the respective first or second direction, the moveable portion having an outer surface opposed to an inner surface, the inner surface being inclined relative to the outer surface at the inclination angle; and (f) an adjustment mechanism arranged to move the moveable portion;

wherein the inner surface of the moveable portion is arranged to abut the inner surface of the fixed portion, with the outer surface of the moveable portion being generally aligned in the respective first or second direction;

the support having a first continuous outer surface incorporating the outer surface of the fixed portion of the first arm, and a second continuous outer surface incorporating the outer surface of the second arm;

the central region having a first pressing face, the first pressing face extending between the first continuous outer surface and the second continuous outer surface, the first pressing face being angled with respect to the first direction by a pressing angle which is less than the given angle.

2. A support for a mitre joint as claimed in claim 1, wherein the central region has a second pressing face, the second pressing face extending between the inner surfaces of the respective fixed portions of the first and second arms.

3. A support for a mitre joint as claimed in claim 2, wherein the first pressing face is parallel to the second pressing face.

4. A support for a mitre joint as claimed in claim 1, wherein the pressing angle is 50% of the given angle.

5. A support for a mitre joint as claimed in claim 4, wherein the central region has a second pressing face, the second pressing face extending between the inner surfaces of the respective fixed portions of the first and second arms.

6. A support for a mitre joint as claimed in claim 5, wherein the first pressing face is parallel to the second pressing face.

7. A support for a mitre joint as claimed in claim 1, wherein the given angle is 90°.

8. A support for a mitre joint as claimed in claim 7, wherein the pressing angle is 45°.

9. A support for a mitre joint as claimed in claim 1, wherein the adjustment mechanism is a linear actuator.

10. A support for a mitre joint as claimed in claim 9, wherein the linear actuator is a lead screw having a head located within the central region of the support.

11. A support for a mitre joint as claimed in claim 10, wherein the central region has a second pressing face, the second pressing face extending between the inner surfaces of the respective fixed portions of the first and second arms, and the lead screw extends through the second pressing face.

* * * * *